June 21, 1966  R. A. COLCLASER ET AL  3,257,604
INVERTER

Filed July 7, 1961                                2 Sheets-Sheet 1

WITNESSES
John E. Healy, Jr.
James T. Young

INVENTORS
Roy A. Colclaser &
Milton P. Vore
BY John L. Stoughton
ATTORNEY

United States Patent Office 3,257,604
Patented June 21, 1966

3,257,604
INVERTER
Roy A. Colclaser, Forest Hills, Pa., and Milton P. Vore, Catonsville, Md., assignors to Westinghouse Electric Corporation, East Pittsburgh, Pa., a corporation of Pennsylvania
Filed July 7, 1961, Ser. No. 121,774
6 Claims. (Cl. 321—45)

This invention relates generally to inverters for inverting a direct current into alternating current and more particularly to such an inverter which supplies a square wave of output current.

An object of this invention is to provide a new and improved inverter of the type described.

A further object of this invention is to provide, in such an inverter, means for decreasing the losses generated in the controlling valves.

A further object of this invention is to provide an inverter utilizing transistors for controlling the current flow with means for decreasing the current through the transistors during switching intervals.

Other objects will be apparent from the description, the appended claims and the drawings in which:

Figure 1:
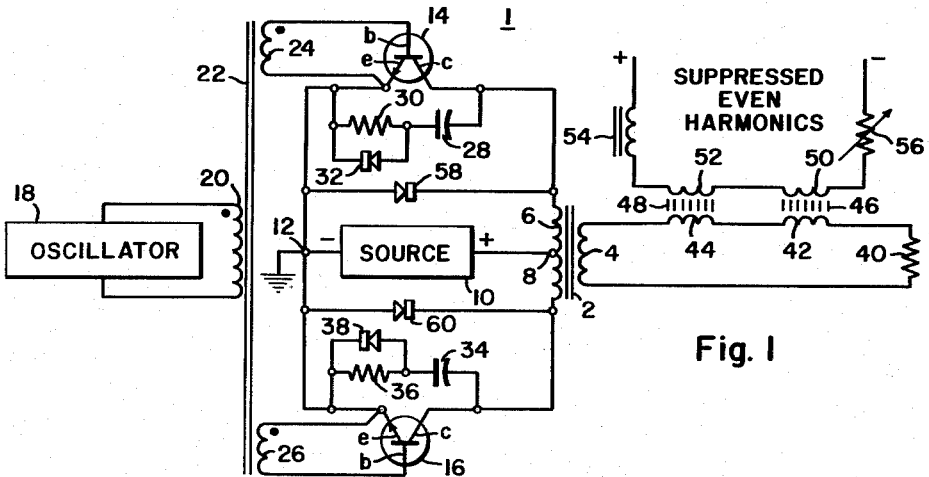
FIG. 1 illustrates schematically an inverter embodying one form of the invention.

Referring to the drawings by characters of reference, the numeral 1 indicates generally an inverter of the so-called push-pull type having an output transformer 2 with an output or secondary winding 4 and a center tapped primary winding 6. The center tap connection 8 of the winding 6 is connected to the positive terminal of the direct current source 10, the negative terminal of which is connected to a common bus 12 which may be grounded as shown if desired. The upper end terminal of the winding 6 is connected to the collector $c$ of a first transistor 14, the emitter $e$ of which is connected to the common bus 12. Likewise, the lower end terminal of the winding 6 is connected to the collector $c$ of a second transistor 16 having its emitter $e$ connected to the common bus 12.

The control signal for operating the transistors 14 and 16 is derived from an oscillator 18 which energizes the input winding 20 of a control transformer 22 having a pair of output or secondary windings 24 and 26. The winding 24 is connected between the emitter $e$ and base $b$ of the transistor 14 and the winding 26 is connected between the emitter $e$ and base $b$ of the transistor 16. The windings 24 and 26 are so poled that at one output polarity of the oscillator 18 the transistor 14 will be driven into conductive saturation and at the other output polarity of the oscillator 18 the output transistor 16 will be driven into conductive saturation.

Under many conditions, the transistors 14 and 16 will be conducting substantial current at the time the conductive conditions thereof will be reversed. Under such conditions, the transistor is called upon to transfer from a saturated condition, in which its internal resistance is very small, to a blocked condition, in which its internal resistance is very high. At either terminal operating conditions of the transistor a minimum of heat is generated therein so that if the transistor were operated continually at either one of these two end conditions a substantial amount of current could be controlled thereby without causing the temperature of the transistor to exceed a predetermined safe value. If, however, during the switching interval the transistor is required to interrupt a substantial current, a substantial amount of heat will be generated within the transistor which of course must be dissipated. If the transistor is operated efficiently, the heat generated therein at its terminal or end conditions should control the current rating of the transistor. If a substantially greater amount of heat is generated during the switching period, the transistor must be derated to prevent overheating.

In accordance with this invention, a shunting circuit is provided across each of the transistors 14 and 16 to decrease the current through the transistors during the "switching off" interval thereof. The shunting circuit across the transistor 14 includes a capacitor 28 connected in series with a resistance 30 which is shunted by a rectifier 32. The polarity of the rectifier 32 permits substantially unimpeded charging current to flow to the capacitor from the winding 6 in the same direction that current flows through the transistor 14 during the time that the transistor 14 is being turned off. Similarly the shunting circuit across the transistor 16 includes a capacitor 34, a resistance 36 and a rectifier 38.

A load of the type in which the transistors 14 and 16 are called upon to interrupt a high load current is illustrated in FIG. 1 and comprises a non-inductive resistive load 40 having one terminal thereof connected to one terminal of the winding 4 and its other terminal connected through the control windings 42 and 44 of saturable reactors 46 and 48 respectively to the other terminal of the winding 4.

The phase of the load current $I_L$ with respect to the phase of the voltage at the terminals of the winding 4 may be controlled by regulating the time of saturation of the reactors 46 and 48. For this purpose the reactors 46 and 48 are provided with control windings 50 and 52 which are connected in series with each other and with a stabilizing inductor 54 and a direct-current controlling device such as a variable resistor 56 across a suitable source of direct current potential (not shown). The impedance of the inductance 54 is relatively high so that the reactors 46 and 48 are operated with suppressed even-harmonic currents.

Figure 3:
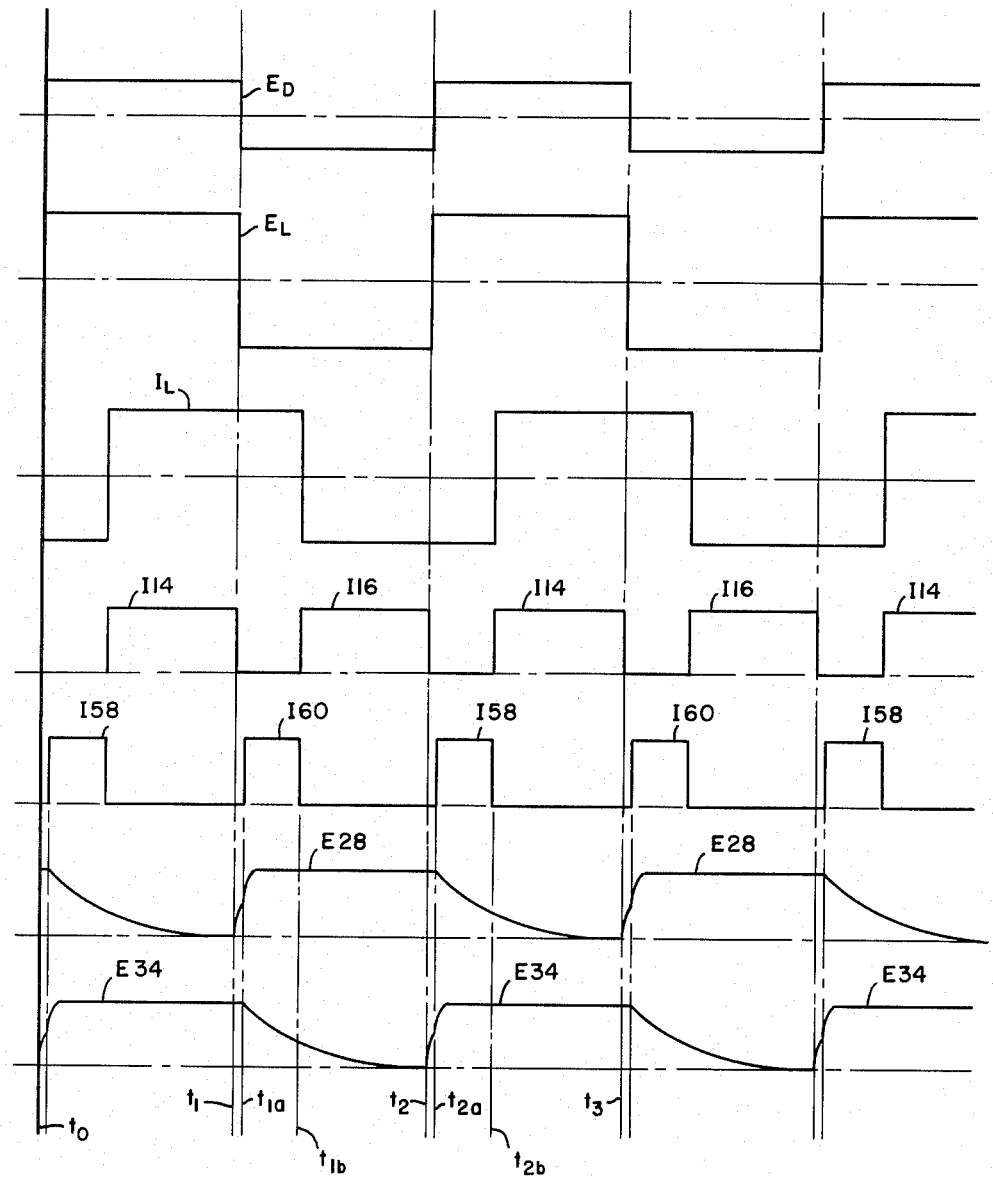

The curve $E_D$ of FIG. 3 represents the output potential of the oscillator 18 which is applied by means of the windings 24 and 26 to control the conductivity of the transistors 14 and 16. It will be apparent that at the positive half-cycle of the oscillator 18 the transistor 14 will be rendered conducting to provide an output voltage across the winding 4 as represented by the positive half-cycle of the curve $E_L$. At the opposite or negative half-cycle of the output of the oscillator 18 the transistor 16 will be rendered conducting and the winding 4 will be energized to provide the negative half-cycle of the curve $E_L$. The square wave voltage $E_L$ is applied across the load connected to the winding 4 and causes a current $I_L$ to flow. The phase displacement between the voltage $E_L$ and the current $I_L$ is determined by the magnitude of the direct current flowing through the control circuit of the saturable reactors 46 and 48.

It will be apparent that the transistors 14 and 16 are called upon to reverse their conductive conditions at the times $t_0, t_1, t_2, t_3$, etc. Due to the inductive nature of the load attached to the winding 4 the current $I_L$ does not terminate at the time that the conductive condition of the transistors are reversed and provisions must be made to permit this inductive current to continue to flow. This is accomplished by means of diodes 58 and 60 which are connected reversedly with the transistors 14 and 16. With this arrangement and upon termination of conduction of one of the transistors 14 or 16 power in the form of inductive current will flow from the load back to the source through the rectifier 60 or 58 as the case may be. This flow of inductive current is independent of whether the one of the transistors 16 or 14, which is in anti-parallel with the conducting one of the rectifiers 60 or 58 is in a condition to conduct because as long as the inductive current flows through the anti-paralleled rectifier the polarity across the associated transistor is opposite to its conducting polarity and current cannot flow therethrough in the forward direction even though a conducting base drive is being provided. Because of this, the control circuit of the transistor associated with the conducting rectifier may be energized for conduction of the transistor even though inductive current is still flowing, it being necessary only that the base drive be provided at termination of the flow of inductive current. When the inductive current terminates and not until this occurs will the transistor conduct in the forward direction. The base current is in step with the curve $E_L$, at the times $t_1$–$t_2$–$t_3$ etc. while the current reverses as indicated by the curve $I_L$ at the times $t_{1b}$–$t_{2b}$ etc.

It will be appreciated that when the transistor 14 is saturated in its conducting condition, the potential across the rectifier 58 is zero while the potential across the rectifier 60 is approximately twice that across the source 10. Under these conditions, the rectifier 60 cannot immediately become conducting so that if no other provision is made to conduct the inductive current during this time interval, the transistor 14 or 16 as the case might be would be forced to conduct this inductive current during the interval prior to conduction of the rectifier 60 or 58. Because of the reduced base drive such current would be delivered at high voltage across the transistor causing the generation of a great amount of heat which, because of the low heat capacity of transistors this substantial quantity of heat, must be quickly dissipated and unless means are provided to prevent this high heat generation, the transistors would have to be derated to take care of this heat surge.

In order to overcome this defect and to maintain the transistor rating, the inductive current is bypassed around the transistor through the shunting capacitor 28 and diode 32 in the case where transistor 14 is being turned off and through the capacitor 34 and diode or rectifier 38 in the case where transistor 16 is being turned off. In order to do this, the capacity of the capacitor must be sufficient to permit current flow until the diode 60 or 58 as the case may be is conditioned for conduction. Allowing a safety factor, this switching time may be considered to be in the neighborhood of 7 to 8 microseconds but will depend upon the particular type of transistor and/or diode which is used. With such an arrangement the inductive current is shunted around the transistor which is being shut off and a lesser amount of heat is generated therein so that a derating of the transistor because of the "switch-off" characteristics is minimized. As an example, if the current through the transistor 14 were 100 amperes supplied from a voltage source of 50 volts and assuming a time interval of 7.5 microseconds for the turn on of the shunting rectifier 58 or 60, a capacitor of 30 microfarads would be satisfactory.

Assuming that the change in conductive condition of the transistors 14 and 16 occurred at the time $t_1$, current will flow into the capacitor 28 to increase the charge therein for the time interval $t_1$–$t_{1a}$. At the time $t_{1a}$, the polarities on the rectifier 60 will have rearranged themselves sufficiently whereby the rectifier 60 conducts as indicated by the curve I60 and continues to conduct until the time $t_{1b}$ when the current $I_L$ reverses as well as the voltage across the rectifier 60 and across the collector and emitter of the transistor 16.

Subsequent to the voltage reversal, current I16 will flow through the transistor 16. Current continues to flow through the transistor 16, as indicated by the curve $I_L$, until the time $t_2$ when the output voltage of the oscillator 18 reverses to render the transistor 16 non-conducting and the transistor 14 conducting. When this occurs, charging current flows to charge the capacitor 34 as indicated by the voltage curve E34. At the time $t_{2a}$ the rectifier 58 will conduct as indicated by the current curve I58. At the time $t_{2b}$, the voltage across the rectifier 58 and transistor 14 reverses, current I58 goes to zero, current I14 starts flowing, current through the rectifier ceases and current through the transistor 14 starts as indicated by the curve I14.

In steady state operation, at the time $t_1$, the voltage across the capacitor 34 would be substantially twice that of the voltage source 10. It will be apparent that the polarity of the diode 38 is such as to prevent a discharge of the capacitor 34. The capacitor 34, therefore, must discharge through the resistor 36 and through the transistor 16 along with the load current. The value of the resistance of the resistor 36 is chosen to maintain the peak discharge current of the capacitor 34 below a value which when added to the value of the other current flowing through the transistor is below that which would drive the transistor 16 out of saturation yet must be small enough to permit essentially complete discharge within one time interval. If the transistor is driven out of saturation, the resistance between its emitter and collector increases substantially causing more heat to be generated in the transistor necessitating a derating thereof below the rating which it might have otherwise.

As will be appreciated the magnitude of the current necessary to drive the transistor out of saturation will depend upon the magnitude of the base current and it is sometimes possible to increase the magnitude thereof sufficiently to prevent the transistor from coming out of saturation. However, since only a lesser magnitude of base current is required during the greater portion of the conducting interval it is undesirable for many reasons to maintain a base drive substantially greater than that necessary to maintain the transistor saturated at normal current. By limiting the magnitude of the capacitor discharge current to a substantially reduced value in which the discharge occurs throughout a greater portion of the conducting period and adjusting the base drive the transistor 16 can be prevented from being driven out of saturation without at the same time overdriving the base more economical operation is obtained.

Figure 2:
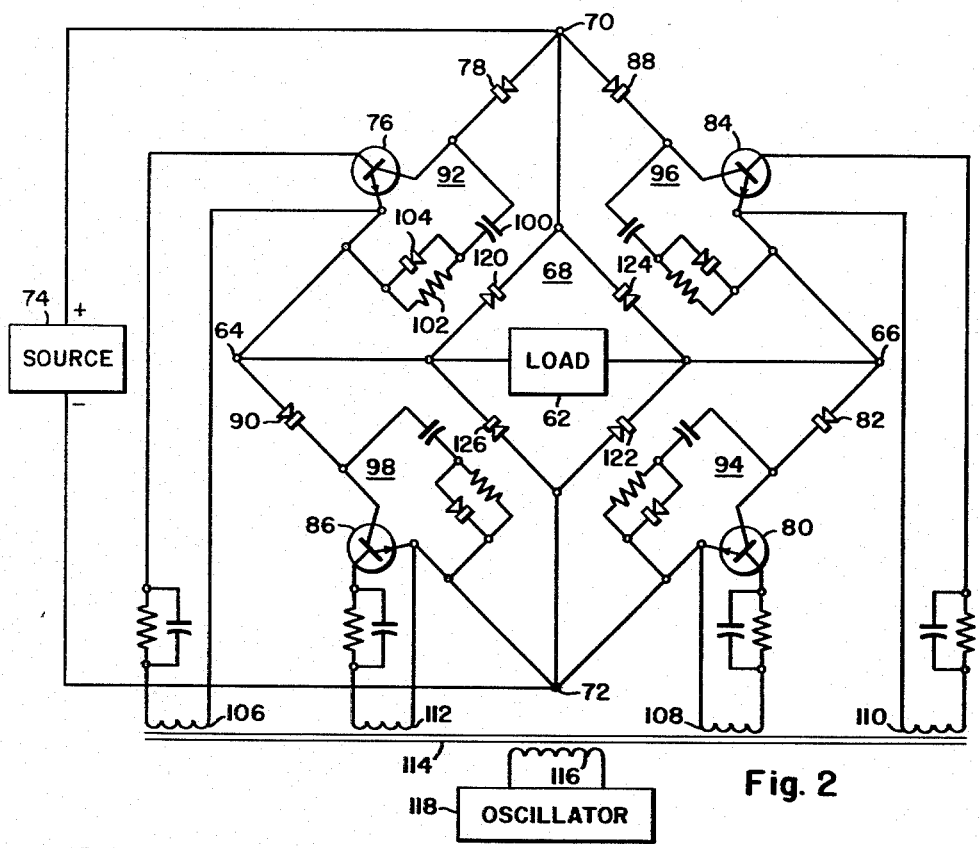
FIG. 2 is a schematic diagram of an inverter embodying another form of the invention; and, FIG. 3 shows a series of curves illustrating certain operational features of the inverters.

In FIG. 2 the load 62 may be of the type described above which comprises a resistor 40 energized through a pair of saturable transformers 46 and 48 having their control windings connected to a source of direct current potential in a manner to suppress even harmonics so that when a potential $E_L$ of square wave shape is supplied thereto the load will draw a square wave of current which voltage and current may be represented by the curves $E_L$ and $I_L$ of FIG. 3 as was the current and voltage supplied to the load by the inverter 1. The load 62 is connected between a pair of output terminals 64 and 66 of a bridge-type inverter 68 having input terminals 70 and 72 which are connected respectively to the positive and negative terminals of a suitable source of direct current potential 74.

The terminals 70 and 64 are connected together for current flow therebetween by means of a transistor 76 and a rectifier 78 poled to provide for conventional current flow from the terminal 70 to terminal 64. The terminal 66 is connected to the terminal 72 through a second transistor 80 and a rectifier 82 poled to provide for conventional current flow from the terminal 66 to the terminal 72. Likewise, the terminals 70 and 66 and the terminals 64 and 72 are connected together by means of the transistors 84 and 86 and rectifiers 88 and 90 to provide a current path from the terminal 70 to the terminal 66 and from the terminal 64 to the terminal 72. Shunting networks 92, 94, 96 and 98 are respectively connected across the transistors 76, 80, 84 and 86 and each cooperate with their associated transistor in the manner discussed above in connection with FIG. 1. As in the arrangement illustrated in FIG. 1, each of the shunting networks includes a capacitor 100, a resistor 102 and a rectifier 104. The transistors 76, 80, 84 and 86 each have their bases and emitters connected across output windings 106, 108, 110 and 112 of a control transformer 114, the primary winding 116 of which is energized from a suitable oscillator 118. Rectifiers 120, 122, 124 and 126 are respectively connected in anti-parallel with transistors 76, 80, 84 and 86. The operation of the structure of FIG. 2 will be apparent from the discussion above with respect to FIG. 1. Curve I14 represents the current flow through the transistors 76 and 80 while the curve I16 represents the current flow through the transistors 84 and 86. The curve I58 represents the current flow through the shunting rectifiers 120 and 122 while the curve I60 represents the current flow through the shunting rectifiers 124 and 126. Similarly, the curve E28 represents the voltage across the capacitor 100 of the networks 92 and 94 while the curve E34 represents the voltage across the capacitors 100 of the networks 96 and 98.

Although the invention has been described with reference to certain specific embodiments thereof, numerous modifications are possible and it is desired to cover all modifications falling within the spirit and scope of the invention.

What is claimed and is desired to be secured by United States Letters Patent is as follows:

1. In an inverter for inverting unidirectional potential to alternating potential, a pair of input terminals adapted to be energized from a source of unidirectional potential, a pair of output terminals adapted to be connected to a load, a pair of current paths connected to said output terminals, each said path when conductive being operable to transmit current between said output terminals, at least one of said paths including said input terminals, each said path including at least one current flow controlling device, each said current flow controlling device having a power conducting path, a plurality of shunting networks, means individually connecting a said shunting network in shunt with each said power path, each said network including in series a rectifier and a capacitor, a plurality of impedance devices, and means individually connecting said impedance devices in shunt with each said rectifier.

2. An apparatus for energization from a source of D.C. energy, a pair of input terminals adapted to be energized from said source, a second pair of terminals, a plurality of semiconductor control elements of the continuous control type, each said element having a main current path and a control circuit, a first path connecting said input terminals to said second terminals for energization of said second terminals in a first polarity and including said main current path of a first of said control elements, a second path connecting said input terminals to said second terminals for energization of said second terminals in a polarity opposite to said first polarity and including said main current path of a second of said control elements, first and second rectifiers, first and second capacitors, first and second impedance elements, means serially connecting together said first rectifier and said first capacitor and connecting said first impedance element in parallel with said first rectifier to provide a first shunting circuit, means serially connecting together said second rectifier and said second capacitor and connecting said second impedance element in parallel with said second rectifier to provide a second shunting circuit, means connecting said first shunting circuit in parallel with said main path of said first control element and said second shunting circuit in parallel with said main path of said second control element, third and fourth rectifiers, means connecting said third rectifier in said first path in anti-parallel with said main path of said first control element, means connecting said fourth rectifier in said second path in anti-parallel with said main path of said second control element, control means connected to said control circuits to alternately render said main circuit of one of said control elements conductive and non-conductive and said main circuit of the other of said control elements non-conductive and conductive.

3. An apparatus for energization from a source of D.C. energy, a pair of input terminals adapted to be energized from said source, a second pair of terminals, a plurality of semiconductor control elements of the continuous control type, each said element having a main current path and a control circuit, a first path connecting said input terminals to said second terminals for energization of said second terminals in a first polarity and including said main current path of a first of said control elements, a second path connecting said input terminals to said second terminals for energization of said second terminals in a polarity opposite to said first polarity and including said main current path of a second of said control elements, first and second rectifiers, first and second capacitors, first and second impedance elements, means serially connecting together said first rectifier and said first capacitor and connecting said first impedance element in parallel with said first rectifier to provide a first shunting circuit, means serially connecting together said second rectifier and said second capacitor and connecting said second impedance element in parallel with said second rectifier to provide a second shunting circuit, means connecting said first shunting circuit in parallel with said main path of said first control element and said second shunting circuit in parallel with said main path of said second control element, third and fourth rectifiers, means connecting said third rectifier in said first path in anti-parallel with said main path of said first control element, means connecting said fourth rectifier in said second path in anti-parallel with said main path of said second control element, control means connected to said control circuits to alternately render said main circuit of one of said control elements conductive and non-conductive and said main circuit of the other of said control elements non-conductive and conductive, first and second saturable reactors each having a control winding and a power winding, an inductor, a resistive load, means connecting said power windings and said load in series across said second terminals, and means connecting said inductor and said control windings in series circuit between a pair of control terminals adapted to be energized from a source of D.C. potential.

4. In a current controlling network for connection between a source of electrical energy and an inductive load, a switching device having a main power circuit through which load current flows, a capacitor, an asymmetric current flow device, a current limiting device, means connecting said asymmetric and said current limiting devices in parallel with each other and in series with said capacitor to provide a first network, and means connecting said first network in shunt with said power circuit.

5. In a current controlling network for connection between a source of electrical energy and an inductive load, a switching device having a main power circuit through which load current flows, a capacitor, an asymmetric current flow device, a current limiting device, means connecting said asymmetric and said current limiting devices in parallel with each other and in series with said capacitor to provide a first network, and means connecting said first network in shunt with said power circuit, said asymmetric device having its lower impedance to current flow in the direction of current flow through said main path.

6. In a current controlling network for connection between a source of electrical energy and an inductive load, a semiconductor switching device having a main power circuit through which load current flows, a capacitor, a rectifier device, a current limiting device, means connecting said asymmetric and said current limiting devices in parallel with each other and in series with said capacitor to provide a first network, and means connecting said first network in shunt with said power circuit, said rectifier device having its lower impedance to current flow in the direction of current flow through said main path.

References Cited by the Examiner

UNITED STATES PATENTS

| 2,912,634 | 11/1959 | Peoples | 321—5 |
| 3,056,094 | 9/1962 | Crawford | 331—113.1 |
| 3,120,633 | 2/1964 | Genuit | 321—45 |
| 3,201,713 | 8/1965 | Stefanov | 331—113 |

FOREIGN PATENTS

| 1,073,617 | 1/1960 | Germany. |
| 1,091,219 | 10/1960 | Germany. |

LLOYD McCOLLUM, *Primary Examiner.*

SAMUEL BERNSTEIN, *Examiner.*

G. J. BUDOCK, G. GOLDBERG, *Assistant Examiners.*